United States Patent
Mutlu et al.

(10) Patent No.: US 10,788,308 B2
(45) Date of Patent: Sep. 29, 2020

(54) PARTICULATE MATTER SENSORS FOR PORTABLE ELECTRONIC DEVICES

(71) Applicant: Apple Inc., Cupertino, CA (US)

(72) Inventors: Mehmet Mutlu, Stanford, CA (US); James J. Dudley, Sunnyvale, CA (US); Mark T. Winkler, San Jose, CA (US); Wenrui Cai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/518,888

(22) Filed: Jul. 22, 2019

(65) Prior Publication Data

US 2020/0096310 A1 Mar. 26, 2020

Related U.S. Application Data

(60) Provisional application No. 62/734,943, filed on Sep. 21, 2018.

(51) Int. Cl.
*G01B 9/02* (2006.01)

(52) U.S. Cl.
CPC ....... *G01B 9/02017* (2013.01); *G01B 9/0201* (2013.01); *G01B 9/02057* (2013.01); *G01B 9/02087* (2013.01)

(58) Field of Classification Search
CPC ............ G01B 9/02049; G01B 9/02054; G01B 9/02057
See application file for complete search history.

(56) References Cited

U.S. PATENT DOCUMENTS

| | | | |
|---|---|---|---|
| 2014/0038222 A1* | 2/2014 | Alt ....................... | G01N 21/648 435/29 |
| 2015/0020804 A1* | 1/2015 | Van Der Mark ... | A61M 16/026 128/203.14 |

\* cited by examiner

*Primary Examiner* — Jonathan M Hansen
(74) *Attorney, Agent, or Firm* — Morgan, Lewis & Bockius LLP (57) ABSTRACT

Aspects of the subject technology relate to particulate matter sensors for electronic devices. A particulate matter sensor may include three lasers, three total-internal-reflection lenses, and three detectors for detecting changes in the operation of the three lasers due to the principles of self-mixing interferometry. The three total-internal-reflection lenses may use internally reflective surfaces to tilt the three beams into three corresponding directions that form an orthogonal basis in the three dimensional space, so that a gas flow speed can be determined while maintaining a small, modular form factor for implementation of the sensor in portable electronic devices.

26 Claims, 7 Drawing Sheets

PARTICULATE MATTER SENSORS FOR PORTABLE ELECTRONIC DEVICES

CROSS-REFERENCE TO RELATED APPLICATIONS

This application claims the benefit of priority under 35 U.S.C. § 119 from U.S. Provisional Patent Application 62/734,943 filed Sep. 21, 2018, which is incorporated herein by reference in its entirety.

TECHNICAL FIELD

The present description relates generally to electronic devices, and more particularly, but not exclusively, to particulate matter sensors for portable electronic devices.

BACKGROUND

In self-mixing interferometry, light emitted by a coherent or partially coherent source, e.g., a laser, is reflected and/or scattered from a target and re-coupled into the optical cavity of the light source. This re-coupling can coherently modify the electric field, carrier distribution, optical gain profile, and lasing threshold of the laser to create a measurable change in the voltage on the laser junction (if the laser is being driven with a current source), a bias current on the laser (if the laser is being driven with a voltage source), and/or the optical power emitted by the laser.

Self-mixing interferometers are sometimes used to measure wind speed by detecting particles in the wind flow that reflect and/or scatter laser light. Based on the determined speed and the number of detected particles over time, the particulate matter concentration in the wind flow can be estimated. In order to reduce errors in wind speed and particulate matter concentration measurements due to an unknown direction of the airflow, particulate matter sensors that implement self-mixing interferometers typically include a fan that moves air at a known speed and in a known direction through a sensing volume.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In order to accurately measure particulate matter concentration in a gas using self-mixing interferometry, it can be important to accurately measure or otherwise know the flow speed of the gas. In some systems, fans are used to move the gas through a measurement volume of a self-mixing interferometer with a known speed and direction. However, this type of gas motion control is typically not practical outside of a laboratory environment and/or requires a bulky, dedicated device with a fan and an internal airflow pathway.

In order to make particulate matter concentration measurements without this type of gas flow control, three self-mixing interferometers are typically desired to infer the wind speed since the wind flow vector is three-dimensional and a self-mixing interferometer can measure the speed in a direction corresponding to the propagation direction of the interferometer's laser beam. When the propagation directions of the beams of these three self-mixing interferometers are not mutually orthogonal, undesirably large errors in wind speed and particulate matter concentration measurements can be made.

For arrangements with three mutually non-orthogonal beams, such large errors can be reduced with the inference of the wind flow direction along each beam, which, with self-mixing interferometry, can be achieved by a wavelength modulation of the emitted laser beam synchronized to particle arrival and transit times followed by a spectral analysis of the self-mixing interferometry signal, e.g., using a fast Fourier transform. However, because the arrival and transit times of particles are often random and cannot be anticipated, large errors in wind speed and particulate matter concentration measurements can remain.

Accordingly, in order to measure the flow speed in various environments, three coherent or partially coherent light sources (e.g., lasers) that generate beams along three mutually perpendicular directions may be provided. These three beams can converge at a measurement location or, in some embodiments, can converge at different locations to perform independent measurements of particulate matter flowing with the gas. However, challenges can also arise in constructing a device with three mutually perpendicular coherent or partially coherent beams, unless the device is a large standalone particulate matter concentration sensor with a flow chamber.

It can therefore be challenging to provide a particulate matter sensor that accurately measures particulate matter concentration with the accuracy provided by flow speed measurements, especially in a compact, modular package that can be implemented in other electronic devices such as handheld or wearable devices, e.g., smart phones, smart watches, or the like.

One option to construct a more compact particulate matter sensor is to provide coherent or partially coherent beams that are mutually perpendicular to form an orthogonal basis in three dimensions. It has been determined that such an orthogonal basis for three beams can be generated by arranging three light sources that generate three corresponding beams with an equidistant angular spacing (e.g., of 120 degrees) and by tilting the beams from each light source (e.g., toward each other) by approximately 54-56 degrees (e.g., when the sensor is used for measurements in air) as explained in greater detail hereinafter. However, it has been discovered that generating a 54-56 degree tilt with sufficient beam quality for particulate matter sensing is extremely challenging using refractive elements such as refractive lenses.

For example, conventional refractive elements made from low-index materials (e.g., materials having refractive indices around 1.4-1-8) do not exhibit the optical power to generate the desired degree of beam tilting. Double-sided refractive elements can be used, but present significant alignment challenges between front and back surfaces. Refractive elements made from high-index materials can in principle achieve the desired tilt, but lenses formed from these high-index materials require high surface profile accuracy and high installation accuracy. An additional challenge with high-index materials is their significant Fresnel reflection losses.

In accordance with various aspects of the subject disclosure, particulate matter sensors are provided that include self-mixing interferometers and total-internal-reflection (TIR) lenses that tilt three coherent or partially coherent beams such that the beam propagation directions after the corresponding lenses form an orthogonal basis in three-dimensional space. In this way, modular particulate matter sensors can be provided that can be implemented in other electronic devices such as portable and/or wearable electronic devices, e.g., smart phones and/or smart watches and/or the like.

Figure 1:
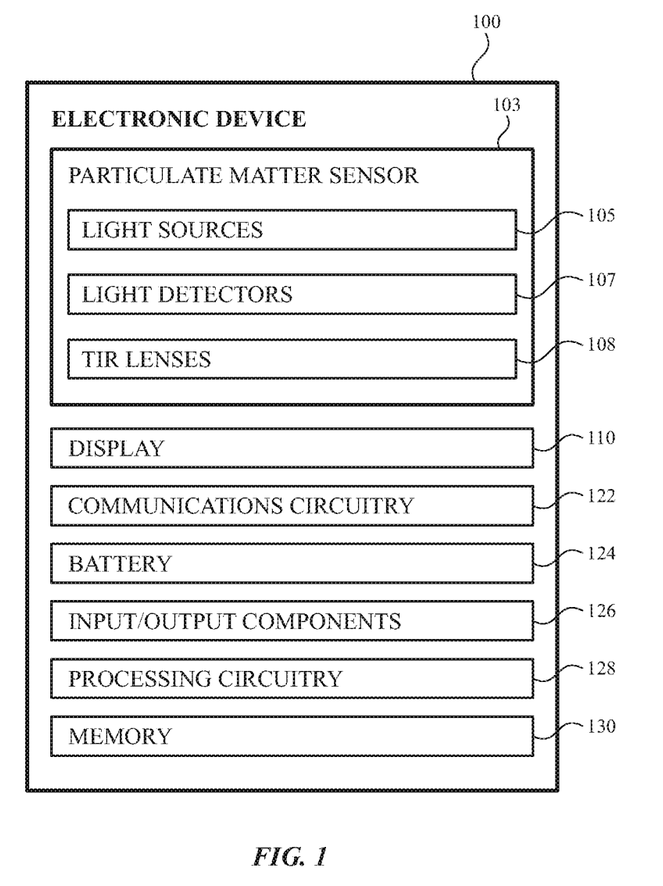
FIG. 1 illustrates a schematic diagram of an electronic device having a particulate matter sensor in accordance with various aspects of the subject technology.

A schematic block diagram of an illustrative electronic device with a particulate matter sensor is shown in FIG. 1. In the example of FIG. 1, electronic device 100 includes particulate matter sensor 103. As shown, particulate matter sensor 103 includes light sources 105, light detectors 107, and TIR lenses 108. Light sources 105 may be coherent or partially coherent light sources such as lasers (e.g., vertical-cavity surface-emitting lasers (VCSELs)). Light detectors 107 may be photodiodes or other light sensors that are separate from light sources 105 or that are each integrated with a corresponding light source 105 (e.g., in an intra-cavity or an extra-cavity arrangement). As described in further detail hereinafter, light sources 105 may be mounted in a common plane such that each emits a beam of light through one or more of TIR lenses 108 that tilt the beams to form an orthogonal basis in the three-dimensional space. The three beams, as viewed in the geometric far-field, i.e., Fraunhofer region, can be angularly spaced by 120 degrees. Light sources 105 may or may not be spaced at the same 120 degree angle. For instance, in one implementation, individual light sources 105 and corresponding TIR lenses can be positioned along a line. In this implementation, the three beams would be focused at different locations. In another implementation that is sometimes described herein as an example, light sources 105 themselves are arranged with 120 degrees angular spacing, to focus the three beams at a common convergence location or close to each other.

Particulate matter sensor 103 may be disposed within one or more internal cavities within an enclosure of electronic device 100 (e.g., an enclosure formed by a housing and/or a display such as display 110). For example, particulate matter sensor 103 may be arranged such that TIR lenses 108 direct the three light beams from within the enclosure of the device to one common convergence location or to multiple convergence locations outside the enclosure of the device (e.g., through an opening in the enclosure or through a transparent structure of the enclosure such as a glass or plastic cover layer for a display such as display 110).

FIG. 1 shows examples of other electronic components that may be included in electronic device 100. For example, electronic device 100 may include processing circuitry 128 and memory 130. Memory 130 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configured to store static data, dynamic data, and/or computer readable instructions for processing circuitry 128. Processing circuitry 128 may be used in controlling the operation of electronic device 100. Processing circuitry 128 may sometimes be referred to as system circuitry or a system-on-chip (SOC) for electronic device 100.

Processing circuitry 128 may include a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 128 may be used to run software for electronic device 100, such as particle sensing operations, particle concentration measurement operations, wind speed and/or direction measurement operations, activity monitoring applications, interne browsing applications, email applications, media playback applications, operating system functions, software for capturing and processing images, software implementing functions associated with gathering and processing sensor data, and/or software that controls audio, visual, and/or haptic functions.

In the example of FIG. 1, electronic device 100 also includes display 110, communications circuitry 122, battery 124, and input/output components 126. Input/output components 126 may include a touch-sensitive layer of display 110, a keyboard, a touch-pad, and/or one or more real or virtual buttons. Input/output components 126 may also include audio components such as one or more speakers and/or one or more microphones. Display 110 may have a cover layer 109 that is transparent to display light and to light beams generated by particulate matter sensor 103.

Electronic device 100 may also include communications circuitry 122, which may be implemented using W-iFi, near field communications (NFC), Bluetooth®, radio, microwave, and/or other wireless and/or wired communications circuitry. Communications circuitry 122 may be operated by processing circuitry 128 based on instructions stored in memory 130 to perform cellular telephone, network data, or other communications operations for electronic device 100. Communications circuitry 122 may include W-iFi and/or NFC communications circuitry operable to communicate with an external device such as a mobile telephone or other remote computing device. In some scenarios, data communications with an external device such as communications by circuitry 122 of a smart watch with a host mobile phone may allow the use of data from the external device to support device operations for electronic device 100. Although not explicitly shown, electronic device 100 may include other sensors such as an ambient light sensor and/or a proximity sensor.

Figure 2:
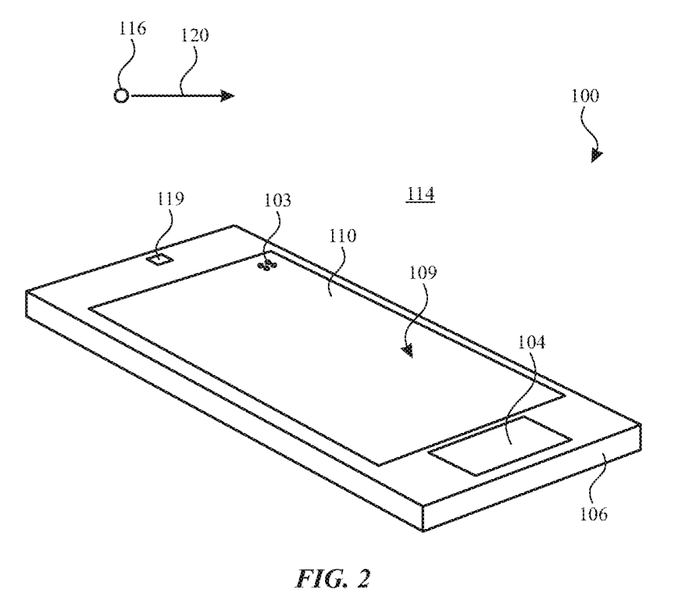
FIG. 2 illustrates a perspective view of an electronic device having a particulate matter sensor and implemented in the form of a handheld device in accordance with various aspects of the subject technology.

FIG. 2 shows how electronic device 100 may include a housing within which one or more of the components of FIG. 1 are enclosed. In the example of FIG. 2, electronic device 100 has been implemented using a housing 106 that is sufficiently small to fit within a user's hand (e.g., electronic device 100 of FIG. 1 may be a handheld electronic device such as a smart phone). As shown in FIG. 2, electronic device 100 may include a display such as display 110 mounted on the front of housing 106. Display 110 may have a cover layer 109 (e.g., a transparent glass or plastic over layer). Cover layer 109 may include openings (e.g., openings in the inactive or active portions of display 110) such as an opening to accommodate button 104 and an opening to accommodate speaker port 119.

The configuration of electronic device 100 of FIG. 2 is merely illustrative. In other implementations, electronic device 100 may be a laptop computer, a tablet computer, a somewhat smaller portable device such as a wrist-watch device, pendant device, or other wearable or miniature device, a media player, a gaming device, a navigation device, a fitness device, or other electronic equipment.

Figure 3:
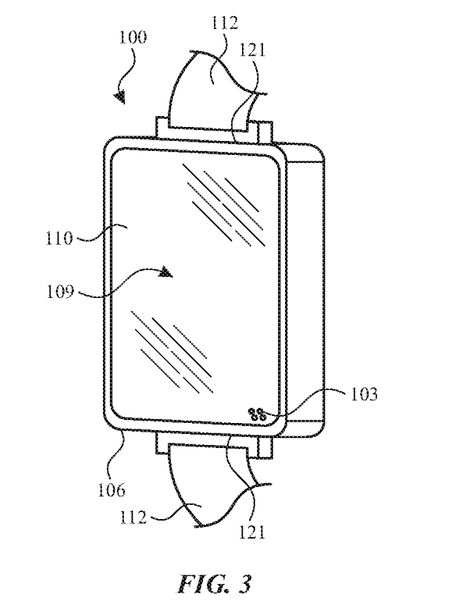
FIG. 3 illustrates a perspective view of an electronic device having a particulate matter sensor and implemented in the form of a smart watch in accordance with various aspects of the subject technology.

For example, FIG. 3 is a perspective view of electronic device 100 in a configuration in which electronic device 100 has been implemented in the form of a wearable device such as a smart watch that includes a particulate matter sensor 103 mounted behind the cover glass 109 of display 110. As shown, in a smart watch implementation, strap 112 may be coupled to housing 106 at interfaces 121 and arranged to secure electronic device 100 to a part of a user's body such as around the user's wrist.

In the example of FIGS. 2 and 3, particulate matter sensor 103 is mounted behind cover layer 109 of display 110 for measurement of a number, a concentration, a speed, and/or a direction of particles such as particle 116 moving in a direction 120 (e.g., a flow direction of gas 114 such as air surrounding the device). However, it should also be appreciated that particulate matter sensor 103 may be mounted at other locations within electronic device 100 such as within an opening in housing 106 or behind a transparent portion of housing 106.

Figure 4:
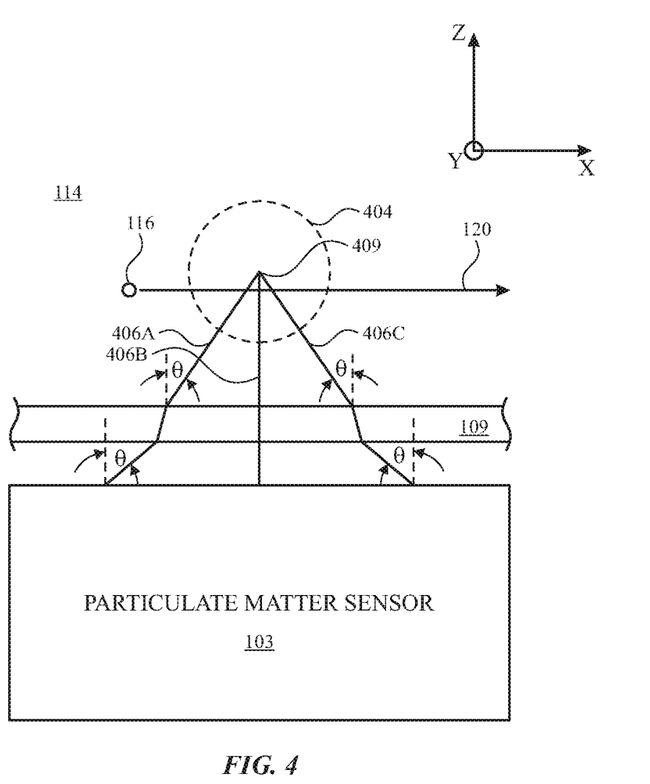
FIG. 4 illustrates a schematic cross-sectional side view of a portion of an electronic device in the vicinity of a particulate matter sensor in accordance with various aspects of the subject technology.
Figure 5:
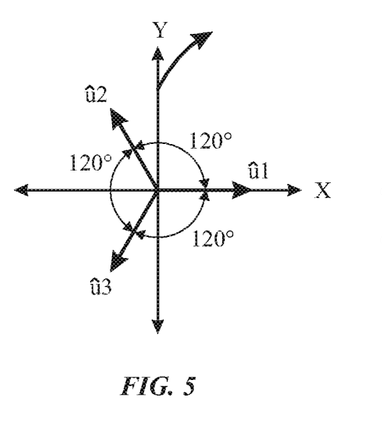
FIG. 5 illustrates unit vector projections of laser emission directions for a particulate matter sensor in accordance with various aspects of the subject technology.

FIG. 4 is a cross-sectional perspective view of a portion of electronic device 100 in an implementation in which particulate matter sensor 103 is mounted behind cover layer 109 of display 110. As shown in FIG. 4, particulate matter sensor 103 emits three coherent or partially coherent light beams 406A, 406B, and 406C (e.g., laser beams), each at a tilt angle θ, where θ may be between 54 and 56 degrees (e.g., 54.74 degrees) with respect to the normal to a plane (X-Y plane) defined by a top surface of particulate matter sensor 103 or the normal to a surface of a plane (X-Y plane) of the cover glass 109 With this tilt angle θ, and with the propagation directions of the three beams being equidistantly angularly spaced around a common axis as indicated by unit vectors in, û$_1$, û$_2$, and û$_3$ of FIG. 5, beams 406A, 406B, and 406C are emitted along directions that form an orthogonal basis in the three dimensional space.

As shown in the example of FIG. 4, the three beams 406A, 406B, and 406C converge at a common convergence location 409 that is external to electronic device 100. When a particle such as particle 116 moves through a measurement volume 404 at or in the close vicinity of convergence location 409, portions of each of beams 406A, 406B, and 406C may be reflected and/or scattered back into the corresponding light source that it originated from located within the particulate matter sensor 103. The reflected and/or scattered light from one or more of beams 406A, 406B, and 406C is detected by particulate matter sensor 103 according to the principles of self-mixing interferometry and processed using analog, e.g., auto-correlation function, auto-covariance function, and/or digital processing methods, e.g., discrete cosine transform, fast Fourier transform, quadrature demodulation, to determine the flow speed of gas 114, to ensure that the direction 120 of the flow of gas 114 does not change the flow speed measurement, to determine the number of particles 116 detected within measurement volume 404 over a period of time, and resultantly, (e.g., in combination with knowledge and/or assumptions of the volumetric mass densities and sizes of the detected particles) the particulate matter concentration, often denoted as PM10, PM2.5, PM1.0, or more generally PMxx for a particle diameter of less than xx microns). Although FIG. 4 illustrates an example in which beams 406A, 406B, and 406C are tilted toward each other to converge at a common convergence location, this is merely illustrative. In other example, beams 406A, 406B, and 406C may converge at different convergence locations associated with different measurement regions for each beam. In some implementations, two or more of beams 406A, 406B, and 406C may propagate in opposite directions from each other.

In the example of FIG. 4, beams 406A, 406B, and 406C pass through cover layer 109 before converging at common convergence location 409. However, the arrangement of FIG. 4 is merely illustrative, and particulate matter sensor 103 may be arranged such that beams 406A, 406B, and 406C do not pass through any other structures or pass through a transparent portion of housing 106 or other transparent structures of electronic device 100 before converging at one or more locations outside of the enclosure of electronic device 100.

Figure 6:
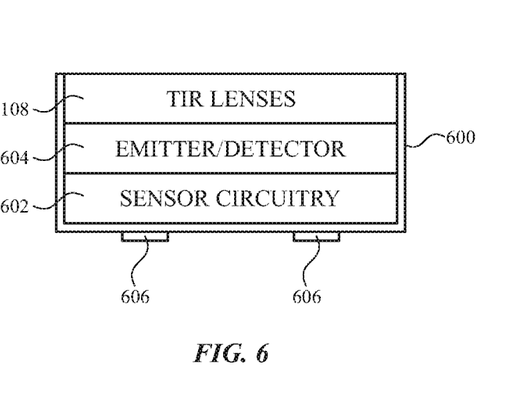
FIG. 6 illustrates a schematic side view of a particulate matter sensor module in accordance with various aspects of the subject technology.

FIG. 6 illustrates a modular arrangement for particulate matter sensor 103. As shown in FIG. 6, particulate matter sensor 103 may include a housing 600 in which sensor circuitry 602, emitter/detector elements 604, and TIR lenses 108 are disposed. For example, emitter/detector elements 604 may include three light sources 105 (e.g., three VCSELs) arranged in a plane and angularly spaced by 120 degrees about a common axis. However, it should be appreciated that this is merely illustrative, and the three light sources 105 may be arranged in various locations so long as the combination of the arrangement of light sources 105 and the corresponding TIR lenses 108 results in the mutual perpendicularity of the emitted beam propagation directions.

Emitter/detector elements 604 may also include three light detectors 107 (e.g., separate from or integrated with light sources 105) that each monitor changes in the operation of light sources 105. For example, each light detector 107 may monitor the optical power of a portion of the light emitted by a corresponding one of light sources 105 or monitor the optical power of a portion of the light present within the cavity of a corresponding one of light sources 105, as the optical power changes due to the presence and motion of particles 116 and gas 114.

Sensor circuitry 602 may include one or more integrated circuits or other processing circuitry configured to operate light sources 105 and light detectors 107 for particulate matter sensing. Sensor circuitry 602 may operate independently for a modular particulate matter sensor 103 and/or may cooperate with system circuitry for a device in which the particulate matter sensor is implemented. In the example of FIG. 6, particulate matter sensor 103 includes electrical contacts 606 for communicatively coupling particulate matter sensor 103 to system circuitry such as processing circuitry 128 and/or memory 130 of electronic device 100, or to circuitry of another device or system.

Accordingly, particulate matter sensor 103 may be configured to provide complete particulate matter concentration values to processing circuitry 128 or can provide raw and/or intermediate sensor data (e.g., voltage changes, current changes, power changes, flow speeds, particle counts, etc.) to processing circuitry 128 for further processing.

Figure 7:
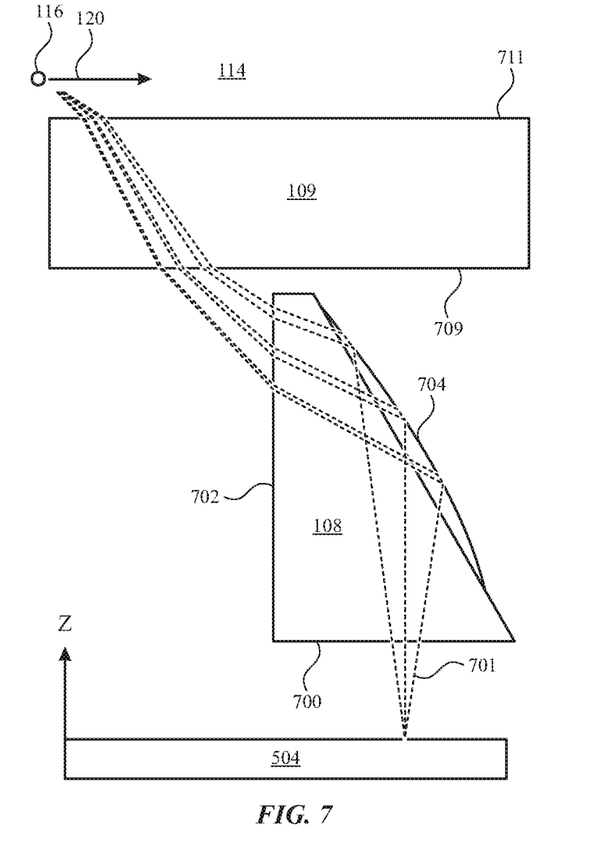
FIG. 7 illustrates a cross-sectional side view of a total-internal-reflection (TIR) lens for a particulate matter sensor in accordance with various aspects of the subject technology.

FIG. 7 shows a cross-sectional view of a portion of electronic device 100, with the cross-section taken through one of TIR lenses 108. In FIG. 7, ray traces 701 for one of beams 406A, 406B, and 406C are shown passing through TIR lens 108 and cover layer 109. As shown, TIR lens 108 may be an aspheric TIR lens having a first planar surface 700, a second planar surface 702 that is perpendicular to first planar surface 700, and an aspheric TIR surface 704. Aspheric TIR surface 704 is disposed at a non-parallel and non-perpendicular angle with respect to surfaces 700 and 702. Ray traces 701 for the beam passing through the TIR lens 108 show how the aspheric TIR surface 704 tilts and simultaneously focuses the beam using only one optical surface (surface 704) with optical power. In this way, the tilt angle θ shown and described above in connection with FIG. 4 can be achieved.

Ray traces 701 also show how, although the beam emerging from the TIR lens 108 is redirected by internal surface 709 of cover layer 109, the beam is returned to its original emission angle when passing through outer surface 711 of cover layer 109 so that the tilt angle θ at which the beam is emitted from TIR lens 108 is unchanged by cover layer 109. In this example, the material outside the TIR lens 108 and the material outside the cover glass are identical. However, TIR lenses 108, cover layer 109, and/or light source 105 can also be arranged to account for differences in the materials inside and outside cover layer 109, if desired.

Figure 8:
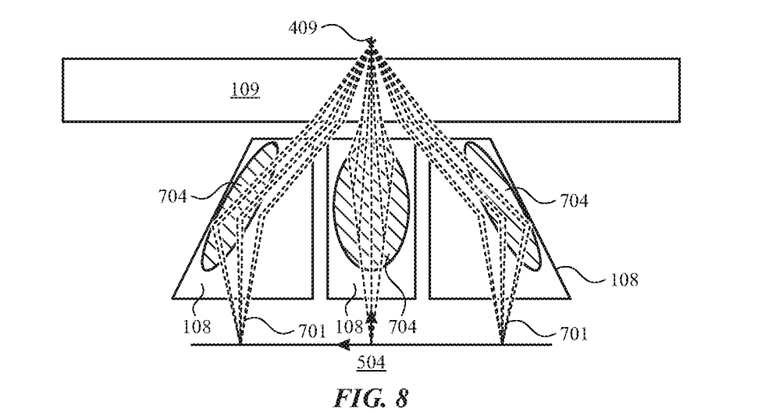
FIG. 8 illustrates a side view of TIR lenses for a particulate matter sensor in accordance with various aspects of the subject technology.
Figure 9:
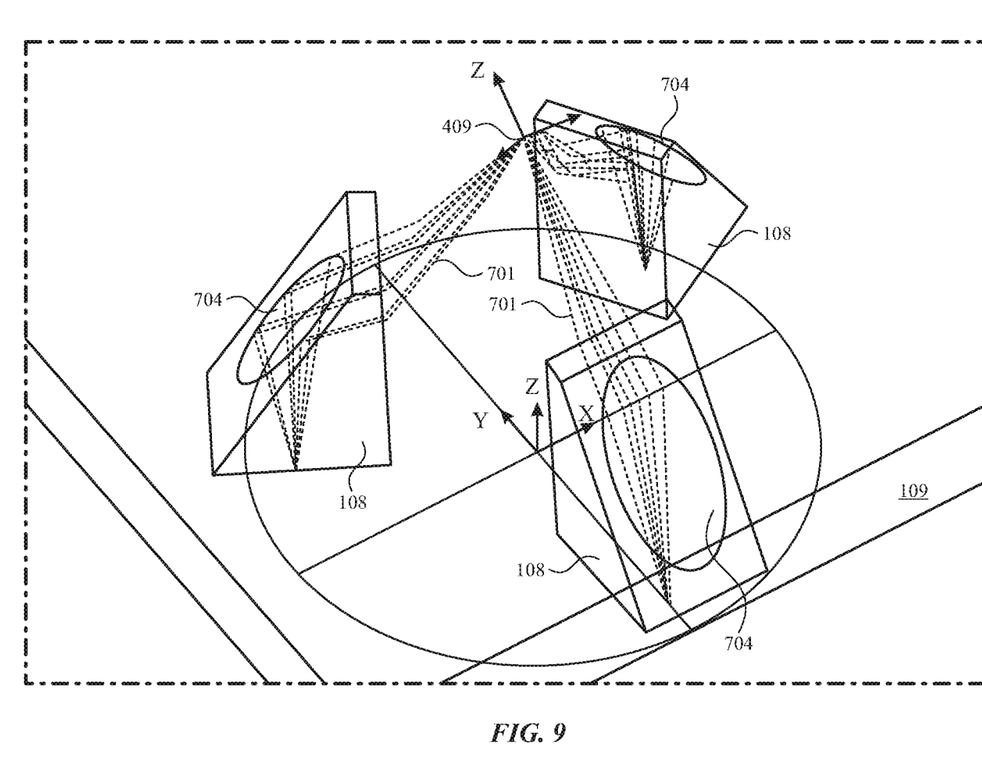
FIG. 9 illustrates a perspective view of TIR lenses for a particulate matter sensor in accordance with various aspects of the subject technology.

FIG. 8 shows a broader side view, and FIG. 9 shows a broader top perspective view, of electronic device 100 in which all three TIR lenses 108, each having an aspheric TIR surface 704 can be seen. FIGS. 8 and 9 also show ray traces 701 for each beam (e.g., emitted from corresponding VCSELs that emit the three corresponding light beams in parallel directions into the three total-internal-reflection lenses that are mounted in a common plane and angularly spaced in the plane at equal angles about a common axis), indicating how the beams converge at common convergence location 409 (in this example) externally to cover layer 109. Although the three TIR lenses 108 of FIGS. 8 and 9 are shown as separate structures, it should be appreciated that two or three of TIR lenses 108 may be formed in a common structure (e.g., a monolithic structure with aspheric surfaces 704 for each lens formed therein.

Figure 10:
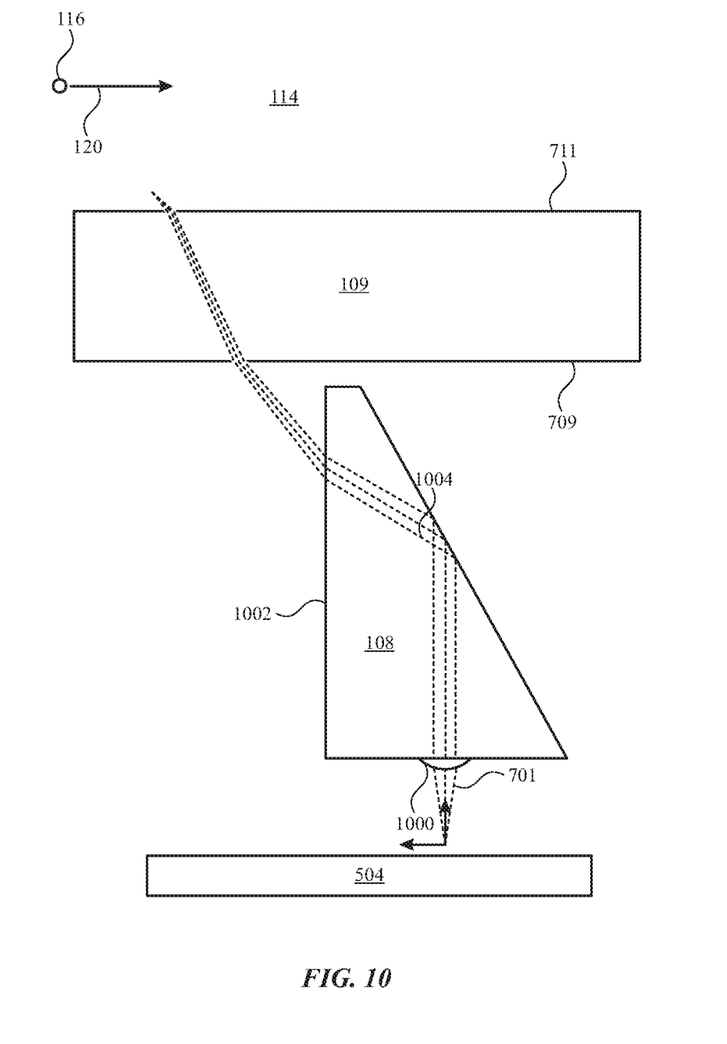
FIG. 10 illustrates a cross-sectional side view of another total-internal-reflection (TIR) lens for a particulate matter sensor in accordance with various aspects of the subject technology.

It should also be appreciated that other TIR lens configurations that generate the desired tilt angle θ for beams 406A, 406B, and 406C can also be used. For example, FIG. 10 shows a cross-sectional view of a portion of electronic device 100 in which another implementation of a TIR lens 108 is used. In the example of FIG. 10, ray traces 701 for one of beams 406A, 406B, and 406C are shown passing through TIR lens 108 and cover layer 109. As shown, TIR lens 108 may be an aspheric lens having a lensed surface 1000, a first planar surface 1002, and a planar TIR surface 1004. Ray traces 701 for the beam passing through the TIR lens 108 show how lensed surface 1000 softly focuses the beam, and planar TIR surface 1004 and first planar surface 1002 cooperate to tilt the beam at the desired angle. In this way, the tilt angle θ shown and described above in connection with FIG. 4 can be achieved. In one or more implementations, at least one of the first planar surface 1002 and the lensed surfaces 1000 and 1004 can be nonplanar. In some implementations, all of the first planar surface 1002 and the lensed surfaces 1000 and 1004 can be nonplanar. As in FIG. 7, ray traces 701 of FIG. 10 show how, although the beam emerging from TIR lens 108 is redirected by internal surface 709 of cover layer 109, the beam is returned to its original emission angle when passing through outer surface 711 of cover layer 109 so that the tilt angle θ at which the beam is emitted from lens 108 is unchanged by cover layer 109 (e.g., in the example in which the same gas/material is present on both sides of cover layer 109). However, TIR lenses 108, cover layer 109, and/or light source 105 can also be arranged to account for differences in the materials inside and outside cover layer 109, if desired.

Figure 11:
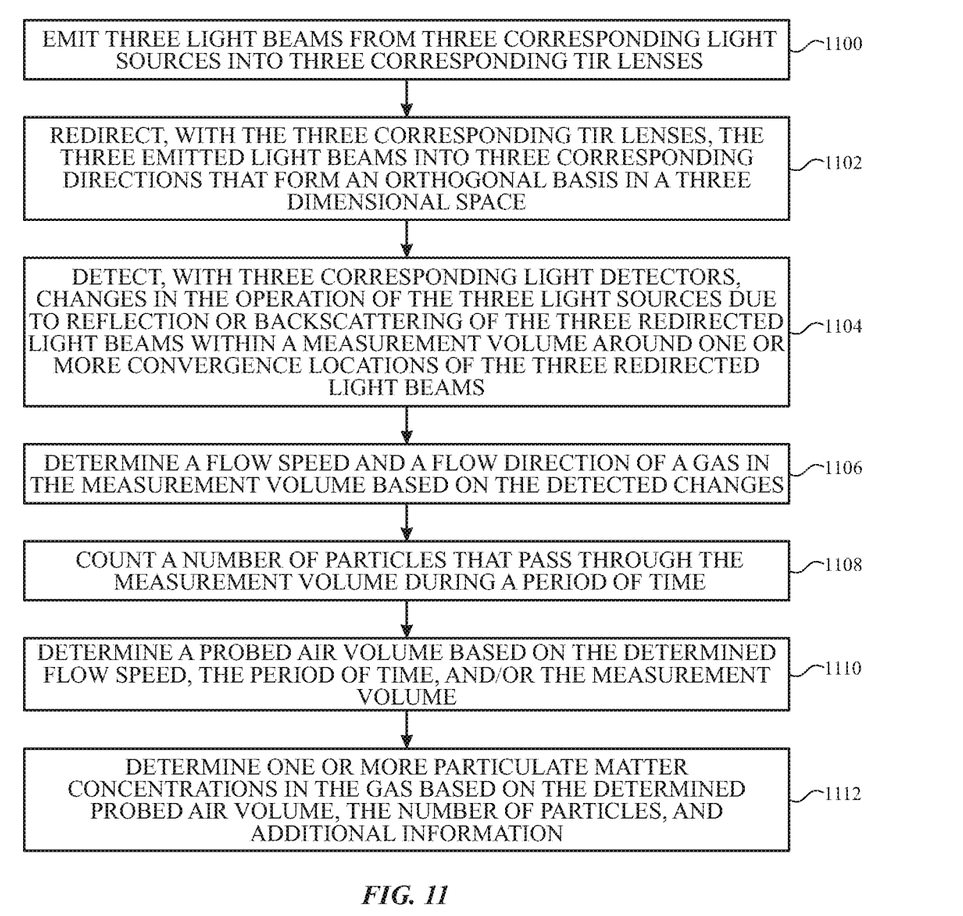
FIG. 11 illustrates a flow chart of an example process for particulate matter concentration measurements with a particulate matter sensor in accordance with various aspects of the subject technology.

FIG. 11 depicts a flow diagram of an example process for particulate matter sensing, in accordance with various aspects of the subject technology. For explanatory purposes, the example process of FIG. 11 is described herein with reference to the components of FIGS. 1-4, 6, and 7-10. Further for explanatory purposes, some blocks of the example process of FIG. 11 are described herein as occurring in series, or linearly. However, multiple blocks of the example process of FIG. 11 may occur in parallel. In addition, the blocks of the example process of FIG. 11 need not be performed in the order shown and/or one or more of the blocks of the example process of FIG. 11 need not be performed.

In the depicted example flow diagram, at block 1100, three light beams such as light beams 406A, 406B, and 406C of FIG. 4 are emitted from three corresponding light sources such as light sources 105 into three corresponding total-internal-reflection (TIR) lenses such as TIR lenses 108. The light sources and the TIR lenses may be components of a particulate matter sensor such as particulate matter sensor 103. The light sources and the TIR lenses may be disposed in a sensor housing 600. The light sources may be operated to emit the three light beams by sensor circuitry 602 of the particulate matter sensor or by processing circuitry such as processing circuitry 128 in which the particulate matter sensor is disposed. The light sources may be lasers such as three VCSELs that emit three parallel beams.

At block 1102, the three corresponding TIR lenses redirect the three emitted light beams into three corresponding directions that form an orthogonal basis in a three-dimensional space. The redirected beams may be redirected to converge at a single common convergence location or at multiple convergence locations (see, e.g., FIGS. 4, 7-9, and/or 10).

At block 1104, three corresponding light detectors such as light detectors 107 detect changes in the operation of the three light sources due to reflection or backscattering of the three redirected light beams within a measurement volume around one or more convergence locations of the three redirected light beams. The change may be detected by detecting a portion of the optical power of light emitted by the lasers, or by detecting a portion of the light present within the cavities of corresponding light sources 105. By the principles of self-mixing interferometry, a reflection and/or backscattering from a particle 116 within a measurement volume 404 of light emitted by a corresponding light source 105 back into the same light source can result in a change of the optical power emitted by that light source, and the optical power present within the cavity of that light source. Because emission wavelengths of the three light sources can be slightly different from one another, it is expected that each reflected and/or scattered beam interfere with a corresponding light source of the three light sources that emitted that reflected and/or scattered beam and not with the other light sources.

At block 1106, processing circuitry such as sensor circuitry 602 of FIG. 6 and/or processing circuitry 128 of electronic device 100 determines a flow speed of a gas such as gas 114 in the measurement volume based on the detected optical power levels at the three light detectors 107 by processing the detected optical power levels using the principles of self-mixing interferometry, e.g. using a fast Fourier transform operation.

At block 1108, the processing circuitry counts a number of particles such as particle 116 that pass through the measurement volume during a period of time.

At block 1110, the processing circuitry determines a probed air volume based on the determined flow speed, the period of time, and/or the measurement volume.

At block 1112, the processing circuitry determines one or more particulate matter concentrations (e.g., PM10, PM2.5, PM1.0, etc.) in the gas based on the determined probed air volume, the number of particles, and additional information. The additional information may include a volumetric mass density, a measured and/or assumed statistical size distribution, and/or a statistical mass of the detected particles. In this way, the operations associated with blocks 1106, 1108, 1110, and/or 1112 can be performed to determine a particulate matter concentration in a gas based on the optical power levels at the three light detectors 107 by employing the principles of self-mixing interferometry.

In accordance with various aspects of the subject disclosure, a particulate matter sensor is provided that includes three light sources and three total-internal-reflection lenses. The three light sources are arranged to emit three corresponding light beams respectively into the three total-internal-reflection lenses. The three total-internal-reflection lenses are arranged to redirect the three corresponding light beams into three corresponding directions that form an orthogonal basis in a three-dimensional space.

In accordance with other aspects of the subject disclosure, a method is provided that includes emitting three light beams from three corresponding light sources into three corresponding total-internal-reflection lenses. The method also includes redirecting, with the three corresponding total-internal-reflection lenses, the three emitted light beams into three corresponding directions that form an orthogonal basis in three dimensions to converge at at least one convergence location. The method also includes detecting, with three corresponding light detectors, changes in the operation of the three light sources due to reflection or backscattering of the three light beams within a measurement volume around the at least one convergence location. The method also includes determining one or more particulate matter concentrations in a gas based on the detected changes.

In accordance with other aspects of the subject disclosure, an electronic device having a particulate matter sensor is provided, the particulate matter sensor configured to emit three light beams from three corresponding light sources into three corresponding total-internal-reflection lenses. The particulate matter sensor is further configured to redirect, with the three corresponding total-internal-reflection lenses, the three emitted light beams into three corresponding directions that form an orthogonal basis in a three dimensional space. The particulate matter sensor is further configured to detect, with three corresponding light detectors, changes in the operation of the three light sources due to reflection or backscattering of the three redirected light beams within a measurement volume around one or more convergence locations of the three redirected light beams. The particulate matter sensor is further configured to determine one or more particulate matter concentrations in a gas based on the detected changes.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A particulate matter sensor, the particulate matter sensor comprising:
    three light sources; and
    three total-internal-reflection lenses, wherein the three light sources are arranged to emit three corresponding light beams respectively into the three total-internal-reflection lenses, and wherein the three total-internal-reflection lenses are arranged to redirect the three corresponding light beams into three corresponding directions that form an orthogonal basis in a three dimensional space.

2. The particulate matter sensor of claim 1, further comprising three light detectors each configured to detect changes in an operation of a corresponding one of the three light sources due to reflection or backscattering from a particle within a measurement volume associated with at least one of the three corresponding light beams.

3. The particulate matter sensor of claim 2, wherein each light detector is configured to detect the changes in the operation of the corresponding one of the three light sources by detecting a change in optical power emitted by that light source.

4. The particulate matter sensor of claim 2, wherein each light detector is configured to detect the changes in the operation of the corresponding one of the three light sources by detecting a change in optical power present within a cavity of that light source.

5. The particulate matter sensor of claim 2, wherein the three light sources comprise three lasers.

6. The particulate matter sensor of claim 5, wherein the three lasers comprise three vertical-cavity surface-emitting lasers that emit the three corresponding light beams in parallel directions into the three total-internal-reflection lenses.

7. The particulate matter sensor of claim 6, wherein the three light detectors comprises three photodiodes, each integrally formed with one of the vertical-cavity surface-emitting lasers.

8. The particulate matter sensor of claim 1, wherein each of the total-internal-reflection lenses comprises an aspheric total-internal-reflection surface.

9. The particulate matter sensor of claim 1, wherein each of the total-internal-reflection lenses comprises a lensed surface and a total-internal-reflection surface.

10. A method, comprising:
    emitting three light beams from three corresponding light sources into three corresponding total-internal-reflection lenses;
    redirecting, with the three corresponding total-internal-reflection lenses, the three emitted light beams into three corresponding directions that form an orthogonal basis in three dimensions to converge at at least one convergence location;
    detecting, with three corresponding light detectors, changes in an operation of the three corresponding light sources due to reflection or backscattering of the three light beams within a measurement volume around the at least one convergence location; and
    determining one or more particulate matter concentrations in a gas based on the detected changes.

11. The method of claim 10, wherein determining the one or more particulate matter concentrations in the gas based on the detected changes comprises determining a flow speed of the gas in the measurement volume based on the detected changes.

12. The method of claim 11, wherein determining the one or more particulate matter concentrations in the gas based on the detected changes further comprises counting a number of particles that pass through the measurement volume during a period of time.

13. The method of claim 12, wherein determining the one or more particulate matter concentrations in the gas based on the detected changes further comprises determining a probed air volume based on the determined flow speed, the period of time, and the measurement volume.

14. The method of claim 13, wherein determining the one or more particulate matter concentrations in the gas based on the detected changes further comprises determining the one or more particulate matter concentrations in the gas based on the determined probed air volume, the number of particles, and additional information.

15. The method of claim 14, wherein the additional information includes at least one of a volumetric mass density, a size distribution, and a statistical mass of counted particles.

16. The method of claim 10, wherein redirecting the three emitted light beams with the three corresponding total-internal-reflection lenses comprises redirecting each of the three emitted light beams with an aspheric total-internal-reflection surface of one of the three corresponding total-internal-reflection lenses.

17. The method of claim 10, wherein redirecting the three emitted light beams with the three corresponding total-internal-reflection lenses comprises redirecting each of the three emitted light beams with a lensed surface and a planar total-internal reflection surface of one of the three corresponding total-internal-reflection lenses.

18. The method of claim 10, wherein emitting the three light beams comprises emitting three laser beams.

19. An electronic device, comprising a particulate matter sensor, the particulate matter sensor configured to:
    emit three light beams from three corresponding light sources into three corresponding total-internal-reflection lenses;
    redirect, with the three corresponding total-internal-reflection lenses, the three emitted light beams into three corresponding directions that form an orthogonal basis in a three dimensional space;
    detect, with three corresponding light detectors, changes in an operation of the three corresponding light sources due to reflection or backscattering of three redirected light beams within a measurement volume around one or more convergence locations of the three redirected light beams; and
    determine one or more particulate matter concentrations in a gas based on the detected changes.

20. The electronic device of claim 19, further comprising an enclosure, and wherein the particulate matter sensor is configured to emit each of the three redirected light beams through a transparent portion of the enclosure at a tilt angle with respect to an outer surface of the enclosure.

21. The electronic device of claim 20, further comprising a display having a transparent cover layer, and wherein the transparent portion of the enclosure comprises a portion of the transparent cover layer of the display.

22. The electronic device of claim 20, wherein the tilt angle is between fifty four degrees and fifty six degrees.

23. The electronic device of claim 19, wherein each of the three corresponding light sources comprises a laser light source that is angularly spaced from other two light sources by one hundred twenty degrees.

24. The electronic device of claim 19, wherein each of the three redirected light beams has a propagation direction, and wherein the propagation direction of each of the redirected light beams is angularly spaced from the propagation direction of both of other redirected light beams by one hundred twenty degrees.

25. The electronic device of claim 19, wherein the one or more convergence locations of the three redirected light beams comprise a single common convergence location for the three redirected light beams.

26. The electronic device of claim 25, wherein the one or more convergence locations of the three redirected light beams comprises at least two different convergence locations.

* * * * *